(12) United States Patent
Matsumoto

(10) Patent No.: US 7,846,614 B2
(45) Date of Patent: Dec. 7, 2010

(54) ELECTRODE FOR SOLID POLYMER ELECTROLYTE FUEL CELL

(75) Inventor: Koichi Matsumoto, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 1377 days.

(21) Appl. No.: 11/289,421

(22) Filed: Nov. 30, 2005

(65) Prior Publication Data
US 2006/0079393 A1    Apr. 13, 2006

Related U.S. Application Data

(62) Division of application No. 10/415,589, filed as application No. PCT/JP01/09518 on Oct. 30, 2001, now abandoned.

(30) Foreign Application Priority Data
Oct. 31, 2000    (JP) ............................. 2000-332183

(51) Int. Cl.
  *H01M 8/10* (2006.01)
(52) U.S. Cl. .................. 429/534; 429/523; 429/535
(58) Field of Classification Search ............... None
See application file for complete search history.

(56) References Cited

U.S. PATENT DOCUMENTS

| | | | | |
|---|---|---|---|---|
| 5,728,485 A | * | 3/1998 | Watanabe et al. | 429/41 |
| 6,060,187 A | * | 5/2000 | Uchida et al. | 429/30 |
| 7,147,957 B1 | * | 12/2006 | Hitomi | 429/40 |

FOREIGN PATENT DOCUMENTS

| | | |
|---|---|---|
| JP | 5-36418 A | 2/1993 |
| JP | 6-251779 A | 9/1994 |
| JP | 6-333574 A | 12/1994 |
| JP | 07-254419 A | 10/1995 |
| JP | 7-254419 A | 10/1995 |
| JP | 8-264190 A | 10/1996 |
| JP | 9-167622 A | 6/1997 |
| JP | 10-284087 A | 10/1998 |
| JP | 10-302805 A | 11/1998 |
| JP | 2000-67877 A | 3/2000 |
| JP | 2000-10048 A | 4/2000 |
| JP | 2002-25560 A | 1/2002 |
| WO | WO-96/11507 A1 | 4/1996 |
| WO | WO-99/66576 A1 | 12/1999 |

* cited by examiner

OTHER PUBLICATIONS

Machine translation of JP 10-284087.*

*Primary Examiner*—Patrick Ryan
*Assistant Examiner*—Cynthia Lee
(74) *Attorney, Agent, or Firm*—Birch, Stewart, Kolasch & Birch, LLP

(57) ABSTRACT

An electrode for solid polymer electrolyte fuel cell comprising a catalyst layer comprising at least electrocatalyst particles (3), a supporting substance therefor (4) and proton-conductive polymers (1) and (2), wherein the proton-conductive polymer (1) is present in a primary presence state in which the proton-conductive polymer (1) covers the electrocatalyst particles (3) or the supporting substance therefor (4), or both at least partly; the proton-conductive polymer (2) is present in a secondary presence state in which the proton-conductive polymer (2) binds the electrocatalyst particles (3) to one another or binds particles of the supporting substance (4) to one another or to the solid polymer electrolyte membrane; and the melt viscosity of the proton-conductive polymer (1) is lower than the melt viscosity of the proton-conductive polymer (2).

3 Claims, 1 Drawing Sheet

ELECTRODE FOR SOLID POLYMER ELECTROLYTE FUEL CELL

This application is a Divisional of application Ser. No. 10/415,589 filed on Apr. 30, 2003 now abandoned and for which priority is claimed under 35 U.S.C. §120. application Ser. No. 10/415,589 is the national phase of PCT International Application No. PCT/JP01/09518 filed on Oct. 30, 2001 under 35 U.S.C. §371. The entire contents of each of the above-identified applications are hereby incorporated by reference.

TECHNICAL FIELD

The present invention relates to an electrode for solid polymer electrolyte fuel cell and a process for production thereof.

BACKGROUND ART

In fuel cells, hydrogen or methanol is electro-chemically oxidized to convert the chemical energy of such a fuel directly to electric energy and this electric energy is recovered. The fuel cells are known as a clean source of supply of electric energy. In particular, solid polymer electrolyte fuel cells are useful as a substitute power source for automobiles, a co-generation system for domestic use, and portable electric generators because they work at a lower temperature as compared with other fuel cells.

Such solid polymer electrolyte fuel cells comprise a solid polymer electrolyte membrane and a pair of gas-diffusion electrodes joined to both sides, respectively, of the membrane. In detail, the solid polymer electrolyte fuel cells have a structure in which an anode catalyst layer is formed on one side of the solid polymer electrolyte membrane and a cathode catalyst layer on the other side, and a pair of electrode supports are provided outside the anode and cathode catalyst layers, respectively, so as to be adjacent to them. The anode and cathode catalyst layers have been those obtained by making a mixture of carbon black powder supporting an electrocatalyst, a proton-conductive polymer and a water-repellent polymer into a sheet, and are joined to the solid polymer electrolyte membrane by hot pressing.

A fuel (e.g. hydrogen) is supplied to the gas-diffusion electrode (as anode) side and an oxidizing agent (e.g. oxygen or air) to the other gas-diffusion electrode (as cathode) side, and the electrodes are connected to each other by an external circuit. The resulting assembly works as a fuel cell. That is, protons are produced in the anode by the oxidation of the fuel and pass through the solid polymer electrolyte to migrate to the cathode side. On the other hand, electrons arrive at the cathode through the external circuit. In the cathode, water is produced from such protons and electrons and oxygen in the oxidizing agent, whereupon electric energy is recovered.

In this case, what is important is that the transfer and conduction of protons and the gas on the surfaces of catalyst particles supported by a supporting substance wholly in the directions of thickness and plane of each catalyst layer are sufficiently achieved, so that electric energy is conducted by the electrode substrates with high efficiency. For this purpose, JP-A-5-36418 discloses a method in which electrodes are obtained by mixing a solid polymer electrolyte, a catalyst, carbon powder and a fluororesin and making the mixture into a film. JP-A-10-302805 has proposed the diameter of colloidal particles of a solid polymer electrolyte which is suitable for forming a layer of the solid polymer electrolyte in a proper thickness on the surface of a catalyst-supporting substance. In addition, JP-A-10-284087 has proposed obtaining the following effects by incorporating at least two proton-conductive polymers different in equivalent weight (EW) into catalyst layers: a polymer with a low EW allows the cell reaction to proceed smoothly and a polymer with a high EW permits rapid discharge of produced water from the catalyst layer to maintain the supply of gases to the catalyst.

However, the advancement of a technique for atomization of a catalyst and supporting-carbon is so remarkable that the ultra-atomization of platinum catalyst to a diameter of 20 to 30 Å has been successful and that the atomization of supporting-carbon to a diameter of 150 to 1000 Å has been realized. It is important to cover the ultra-atomized catalyst and the supporting-carbon with a solid polymer electrolyte as uniformly as possible to improve the utilization factor of the catalyst as much as possible and optimize the transfer and conduction of protons and gases on the surfaces of catalyst particles. It is also important to maintain the transfer of electrons between catalyst particles and a supporting substance, that among particles of a supporting substance and that between the supporting substance and an electrode support. However, although the supporting substance can be covered or bound to a certain extent with a solid polymer electrolyte in a colloidal state, it is difficult to sufficiently cover ultra-fine electrocatalyst particles supported on the supporting substance with such a polymer electrolyte. When a fluororesin is used for binding the supporting substance, the proton conductivity is unavoidably deteriorated. Also when the catalyst layers contain at least two proton-conductive polymers different in equivalent weight (EW), the molecular weights of the proton-conductive polymers have not yet been optimized.

With the ultra-atomization of catalyst particles, the extension of the lifetime of the catalyst becomes a problem. In the course of use of the catalyst, catalyst particles are aggregated to become large, so that their surface area is decreased, resulting in the deterioration of the catalyst. In order to avoid this deterioration, catalyst particles are covered with a solid polymer electrolyte as uniformly as possible as in the case of the electrode for fuel cell of the present invention, whereby the extension of the lifetime can be expected.

DISCLOSURE OF THE INVENTION

The present invention has the following object: in order to maximize the utilization factor of a catalyst, electrocatalyst particles supported by a supporting substance in an electrocatalyst layer are covered with a solid polymer electrolyte composed of a proton-conductive polymer, as uniformly as possible to optimize the transfer and conduction of protons and a gas on the catalyst surface and optimize binding among particles of the supporting substance and binding between the supporting substance and a solid polymer electrolyte membrane while maintaining the transfer of electrons between electrocatalyst particles and the supporting substance.

The present inventor earnestly investigated in order to achieve the above object, and consequently found that the utilization factor of a catalyst and characteristics of a fuel cell can be improved as follows: as to proton-conductive polymers as solid polymer electrolytes, i.e., a proton-conductive polymer to be allowed to assume a presence state in which the proton-conductive polymer is attached to electrocatalyst particles and another proton-conductive polymer to be allowed to assume a presence state in which a supporting substance supporting electrocatalyst particles is bound with the proton-conductive polymer, properties of the former proton-conductive polymer and a solution or dispersion thereof are made different from those of the latter proton-conductive polymer and a solution or dispersion thereof. On the basis of this finding, the present invention has been accomplished.

That is, the present invention relates to an electrode for solid polymer electrolyte fuel cell comprising a catalyst layer comprising at least electrocatalyst particles, a supporting substance therefor and proton-conductive polymers, which is characterized in that the proton-conductive polymers are present in the following primary presence state and secondary presence state, respectively: the primary presence state in which one of the proton-conductive polymers covers the electrocatalyst particles and/or the supporting substance therefor, and the secondary presence state in which the other proton-conductive polymer binds particles of the catalyst-supporting substance containing the covered electrocatalyst particles to one another; and that the EW and melt viscosity of the proton-conductive polymer to be allowed to assume the primary presence state are lower than those of the proton-conductive polymer to be allowed to assume the secondary presence state. The present invention relates also to a process for producing the electrode for solid polymer electrolyte fuel cell.

BRIEF DESCRIPTION OF THE DRAWINGS

In FIG. 2, numeral 7 denotes the pore portion and void portion of the catalyst-supporting substance.

BEST MODE FOR CARRYING OUT THE INVENTION

Figure 1:
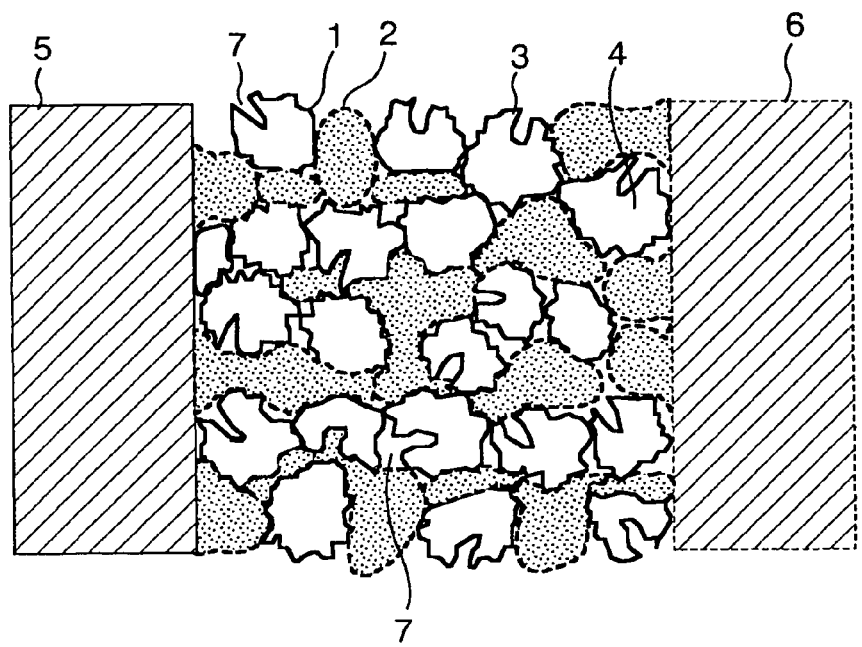
FIG. 1 is a schematic view of the electrode for fuel cell of the present invention.
Figure 2:
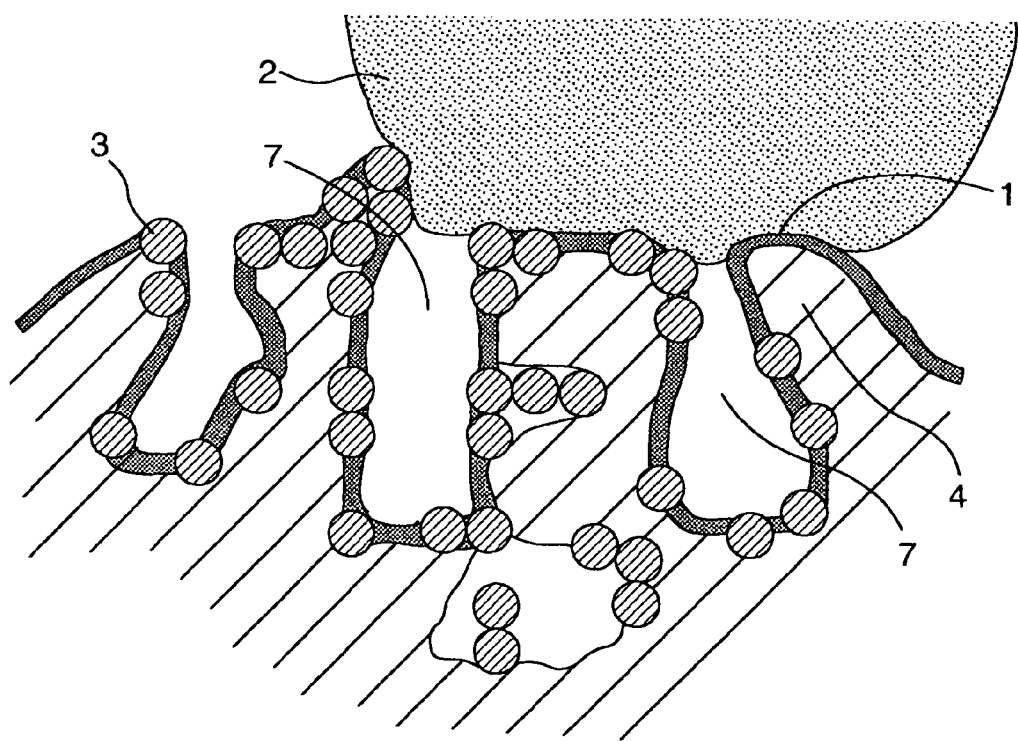
FIG. 2 is a diagram showing a state in which a proton-conductive polymer (1) in the primary presence state covers the surface of the supporting substance (4) supporting electrocatalyst particles (3) shown in FIG. 1.

The present invention is concretely explained below with reference to FIG. 1 and FIG. 2.

The catalyst (3) in the present invention is an electrocatalyst in anode and cathode catalyst layers constituting a solid polymer electrolyte fuel cell. The catalyst (3) catalyzes the oxidation of a fuel (e.g. hydrogen) to produce protons in the anode and catalyzes the reaction of protons and electrons with an oxidizing agent (e.g. oxygen or air) to produce water in the cathode. Although platinum is suitable as a material for the catalyst in present-day techniques, there is used a catalyst obtained by adding ruthenium or the like to platinum or alloying ruthenium with platinum, in order to improve the resistance to impurities. The catalyst, however, is severely limited from the viewpoint of cost and resources. Therefore, it is necessary to enhance the catalytic capability and reduce the amount of the catalyst used, and the increase of surface area of the catalyst and the ultra-atomization of the catalyst are in progress. In the present invention, as to the particle size of the catalyst, the diameter of a particle of the catalyst is preferably, in particular, 500 Å or less, more preferably 100 Å or less, still more preferably 50 Å or less.

In the present invention, the catalyst-supporting substance (4) is a substance that supports the catalyst to permit transfer and conduction of electrons. In present-day techniques, fine carbon powder is suitable as the supporting substance, and carbon nano-tubes and carbon nano-horns can also be used as the supporting substance. In order to support the catalyst ultra-atomized, in an efficiently dispersed state, the increase of surface area of the supporting substance, the atomization of the supporting substance and the optimization of a carbon structure are carried out. In the present invention, the particle size of the supporting substance is preferably 100 to 5000 Å, more preferably 150 to 1500 Å. The average particle size of the supporting substance is preferably 200 to 500 Å.

In the present invention, the proton-conductive polymers (1) and (2) are polymers containing proton-conductive functional groups. Functional groups of at least one kind are selected from sulfonic acid groups and carboxylic acid groups. As to the skeletons of the polymers, fluorine-containing polymers excellent in oxidation resistance and heat resistance are preferable.

The fluorine-containing polymers include, for example, copolymers of two or more kinds of monomers selected from the following first group of monomers and the following second group of monomers as an essential monomer(s): the first group of monomers include: tetrafluoroethylene, trifluoromonochloroethylene, trifluoroethylene, vinylidene fluoride, 1,1-difluoro-2,2-dichloroethylene, 1,1-difluoro-2-chloroethylene, hexafluoropropylene, 1,1,1,3,3-pentafluoropropylene, octafluoroisobutylene, etc. The second group of monomers include those represented by the following general formula (1):

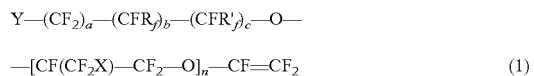

$$-[CF(CF_2X)-CF_2-O]_n-CF=CF_2 \qquad (1)$$

wherein Y is —SO$_3$H or —COOH, a is 0 to 6, b is an integer of 0 to 6, c is 0 or 1, provided that a+b+c is not equal to 0, X is Cl, Br, F or a mixture thereof in the case where n>1, n is 0 to 6, and R$_f$ and R'$_f$ are independently selected from the group consisting of F, Cl and fluorochloroalkyl groups having approximately 1 to 10 carbon atoms; and polymers of one or more kinds of monomers selected from the above second group of monomers. The functional group for Y can be subjected to polymerization in the form of —SO$_2$F, —COOR, —CN, —COF or the like and then can be converted to the form defined above as Y, by hydrolysis after the polymerization. Perfluorocarbon polymers having sulfonic acid groups are especially preferable. In the above general formula, n is preferably 0 to 2 and (a+b+c) is preferably 2 to 4. In addition, the following are especially preferable: n is 0 to 1, a is 2 to 3, b=0 and c=0. There can also be used mixtures of two or more of the above-exemplified polymers, and mixtures of perfluorocarbon copolymers having sulfonic acid groups which are different in EW and molecular weight.

The polymerization degrees of the proton-conductive polymers (1) and (2) are optimized for the primary presence state and secondary presence state, respectively, referred to herein. Since the proton-conductive polymers (1) and (2) used in the present invention have extremely hydrophilic portions and extremely water-repellent portions in the polymer molecule, the measurement of their polymerization degree and molecular weight is generally difficult. In the present invention, MI of a precursor of each of the proton-conductive polymers (1) and (2) is used as an indication of the polymerization degree and molecular weight, an indication of the wettability for the electrocatalyst particles (3), the supporting substance therefor (4) and the solid polymer electrolyte membrane (5), and an indication of the solubility or dispersibility in water or a solvent.

MI referred to here is a melt index according to ASTM standard D1238. In the present description, MI is expressed as the weight of a polymer that flows per 10 minutes [g/10 minutes] through an orifice with an inside diameter of 2.09 mm and a length of 8 mm at 270° C. or 150° C. under a load of 2.16 kg in Melt Indexer Model S-01 manufactured by Toyo Seiki Seisaku-sho Co., Ltd.

The reason why the precursors of the proton-conductive polymers (1) and (2) are used in the MI measurement is that the measurement of MI of the proton-conductive polymer containing sulfonic acid groups and carboxylic acid groups is difficult because the polymer is generally decomposed at a high temperature. In the present invention, when the functional groups of the proton-conductive polymer are sulfonic acid groups, —$SO_2F$ groups are preferable as the functional groups of the precursor. When the functional groups of the proton-conductive polymer are carboxylic acid groups, —$CO_2CH_3$ groups are preferable as the functional groups of the precursor. Therefore, —$SO_2F$ groups or —$CO_2CH_3$ groups were employed as the functional groups of the precursors for measuring MI.

The proton-conductive polymer (1) to be allowed to assume the primary presence state in the present invention is optimized while attaching importance to its surface wettability for the electrocatalyst particles and/or the supporting substance therefor (4), the ease of formation of a polymer solution or dispersion capable of covering the ultra-fine electrocatalyst particles with a large surface area (3) and/or the supporting substance therefor (4), and the solution viscosity capable of affecting the coating thickness. Therefore, the MI value at 270° C. of the proton-conductive polymer (1) to be allowed to assume the primary presence state in the present invention is preferably 10 or more, more preferably 100 or more. Furthermore, the MI value at 150° C. of this proton-conductive polymer (1) is preferably 10 or more, more preferably 100 or more. When the MI value is too low, the surface wettability for the electrocatalyst particles (3) and/or the supporting substance therefor (4) is deteriorated, so that the formation of a polymer solution or a dispersion of polymer fine particles becomes difficult. The upper limit of the MI value of the proton-conductive polymer (1) to be allowed to assume the primary presence state in the present invention is not determined, and a liquid oligomer obtained by bonding two or more molecules of a monomer can be used as the proton-conductive polymer (1) so long as it has proton conductivity and surface affinity or wettability for the electrocatalyst particles (3) or the supporting substance therefor (4) and the proton-conductive polymer (2) to be allowed to assume the secondary presence state. However, considering the reproducibility of production and the durability of the electrode, the MI value at 150° C. is preferably 10000 or less more preferably 1000 or less. In the present invention, the MI value of the precursor of the proton-conductive polymer (1) to be allowed to assume the primary presence state is preferably higher than the MI value of the precursor of the proton-conductive polymer (2) to be allowed to assume the secondary presence state.

The proton-conductive polymer (2) to be allowed to assume the secondary presence state in the present invention is optimized while attaching importance to its surface affinity, binding strength and durability for the proton-conductive polymer (1) in the primary presence state covering the electrocatalyst particles (3) and/or the supporting substance therefor (4), and its surface affinity, binding strength and durability for the solid polymer electrolyte membrane (5). Therefore, the MI value at 270° C. of the precursor of the proton-conductive polymer (2) to be allowed to assume the secondary presence state in the present invention ranges preferably from 0.1 to 100, more preferably from 1 to 50. When this MI value is less than 0.1, micelles in a dispersion of the polymer generally become large, so that the surface wettability for the electrocatalyst particles (3) and/or supporting substance therefor (4) covered with the proton-conductive polymer (1) in the primary presence state, and the solid polymer electrolyte membrane (5) or the electrode supports (6) is deteriorated, resulting in an unsatisfactory microstructure in the electrode layer. Moreover, since binding points are decreased, the binding strength is undesirably decreased. When the MI value is too high, micelles in a dispersion of the polymer become small, and hence the surface wettability for the electrocatalyst particles (3) and/or supporting substance therefor (4) covered with the proton-conductive polymer (1) in the primary presence state, and the solid polymer electrolyte membrane (5) is excessively enhanced, so that the formation of the optimum microstructure in the electrode layer is undesirably difficult. In addition, because of the low molecular weight, the binding strength and the durability are undesirably low. The size of micelles and the dispersion of molecules in a liquid, however, are variable depending on the kind of solvent, and the optimum state can be chosen within the above range. The term "the optimum microstructure in the electrode layer" used herein means the following state: the electrocatalyst particles (3) and the supporting substance therefor (4) are at least partly covered with the proton-conductive polymer (1) in the primary presence state, and particles of the at least partly covered supporting substance (4) are connected to one another by the proton-conductive polymer (2) in the secondary presence state by spot or partial adhesion, so that the electrode layer holds fine spaces capable of permitting gas diffusion which are scattered in the electrode layer. The microstructure in the electrode layer in the case where the aforesaid MI value is too low refers to the following state: particles covered with the proton-conductive polymer (1) in the primary presence state cannot be uniformly bound to one another, resulting in narrow proton conduction regions and too wide gas diffusion spaces. The microstructure in the electrode layer in the case where the aforesaid MI value is too high refers to the following state: particles covered with the proton-conductive polymer (1) in the primary presence state are excessively bound to one another, resulting in wide proton conduction regions and too narrow gas diffusion spaces. For maintaining the transfer and conduction of electrons in an electrocatalyst layer, it is preferable in the microstructure that the proton-conductive polymer (1) in the primary presence state does not completely cover the supporting substance (4) but partly covers the supporting substance (4), or that the coating thickness of this proton-conductive polymer (1) is small to such an extent that the proton-conductive polymer (1) does not hinder or hardly hinders the transfer and conduction of electrons.

The EW values of the proton-conductive polymers (1) and (2) are optimized for the primary presence state and secondary presence state, respectively, referred to herein. The term "EW" used herein means the equivalent weight of a proton-conductive ion-exchange group. The equivalent weight is the dry weight of the proton-conductive polymer per equivalent of the ion-exchange group and is expressed in a unit "g/equivalent". EW is measured by titrating a free-acid type polymer with an aqueous sodium hydroxide standard solution.

The proton-conductive polymer (1) to be allowed to assume the primary presence state in the present invention is optimized while attaching importance to its surface affinity for the electrocatalyst particles (3) and/or the supporting substance therefor (4), and the ease of formation of a polymer solution capable of covering the ultra-fine electrocatalyst particles with a large surface area (3) and/or the supporting substance therefor (4). Therefore, the EW value of the proton-conductive polymer (1) to be allowed to assume the primary presence state in the present invention ranges preferably from 500 to 1200, more preferably from 600 to 900. When the EW value is too low, the hydrophilicity is too high and the binding strength and durability for the proton-conductive polymer (2)

in the secondary presence state are low, which is undesirable. When the EW value is too high, the proton conductivity is low, the surface affinity for the electrocatalyst particles (3) and/or the supporting substance therefor (4) is low, and the formation of a suitable polymer solution is difficult.

The proton-conductive polymer (2) to be allowed to assume the secondary presence state in the present invention is optimized while attaching importance to its surface affinity, binding strength and durability for the proton-conductive polymer (1) in the primary presence state covering the electrocatalyst particles (3) and/or the supporting substance therefor (4), and its surface affinity, binding strength and durability for the solid polymer electrolyte membrane (5). Therefore, the EW value of the proton-conductive polymer (2) to be allowed to assume the secondary presence state in the present invention ranges preferably from 850 to 1500, more preferably from 900 to 1300. When the EW value is too low, the hydrophilicity is too high and the binding strength and durability are low, which is undesirable. When the EW value is too high, the proton conductivity is low, the surface affinity for the proton-conductive polymer (1) in the primary presence state and the solid polymer electrolyte membrane (5) is low, the binding strength is low, and the formation of a satisfactory polymer dispersion having the most suitable micelle diameter is difficult.

In the present invention, each of the proton-conductive polymers (1) to be allowed to assume the primary presence state and the proton-conductive polymers (2) to be allowed to assume the secondary presence state is used in the form of a solution or dispersion in any of various solvents. Preferable examples of the solvents are alcohols such as methanol, ethanol, propanol, butanol, etc.; polar solvents such as acetone, methyl ethyl ketone, ethyl acetate, propyl acetate, butyl acetate, N,N-dimethylacetamide, N,N-dimethyl-formamide, dimethyl sulfoxide, sulfolane, etc.; cyclic ethers such as tetrahydrofuran, etc.; mixtures of two or more members selected from the above groups of solvents; and mixtures of water and solvent(s) selected from the above groups of solvents. In addition, mixed solvents of at least one member selected from the above groups of solvents and a fluorine-containing compound such as fluorocarbon, a fluorine-containing alcohol or the like can also be used.

By the use of any of the above-exemplified solvents, the proton-conductive polymer (1) to be allowed to assume the primary presence state in the present invention can be made into a solution or a dispersion having a smaller size of dispersed particles, as compared with the proton-conductive polymer (2) to be allowed to assume the secondary presence state. By the use of any of the above-exemplified solvents, the proton-conductive polymer (2) to be allowed to assume the secondary presence state in the present invention can be made into a dispersion having a larger size of dispersed particles, as compared with the proton-conductive polymer (1) to be allowed to assume the primary presence state. Dispersed particles in the dispersion form micelles containing the solvent in particles, and the size of the micelles can be measured by a light scattering method. Usually, the size of dispersed particles of the proton-conductive polymer (2) to be allowed to assume the secondary presence state in the present invention ranges preferably from 50 to 1000 nm, more preferably from 100 to 600 nm. When the size of dispersed particles is outside the above range, the microstructure in the electrode layer becomes unsatisfactory, which is undesirable. The size of dispersed particles of the proton-conductive polymer (1) to be allowed to assume the primary presence state in the present invention is preferably in a range of a dissolved state to 100 nm, more preferably in a range of a dissolved state to 50 nm. When the size of dispersed particles is outside this range, covering of the electrocatalyst particles (3) or the supporting substance therefor (4) becomes difficult or the coating thickness becomes too large, which is undesirable.

The concentration of the polymer solution or dispersion used in the present invention ranges preferably from 0.1 to 20 wt %. The concentration of the solution or dispersion of the proton-conductive polymer (1) ranges preferably, in particular, from 0.1 to 10 wt %. The concentration of the solution or dispersion of the proton-conductive polymer (2) ranges preferably, in particular, from 3 to 20 wt %.

When the concentration of the solution or dispersion is too low, uniform covering of the electrocatalyst particles (3) or the supporting substance therefor (4) is undesirably difficult. When this concentration is too high, the solubility or dispersibility of the polymer in the solution or dispersion is low, so that the dispersibility of the polymer onto the electrocatalyst particles (3) or the supporting substance therefor (4) is low and that the polymer adheres to or covers the electrocatalyst particles (3) or the supporting substance therefor (4) too thickly, which is undesirable.

The term "the primary presence state of a proton-conductive polymer" used herein means a state in which the proton-conductive polymer covers the electrocatalyst particles (3) and/or the catalyst-supporting substance therefor (4). The term "the secondary presence state of a proton-conductive polymer" used herein means a state in which a large portion of the proton-conductive polymer binds particles of the catalyst-supporting substance (4) containing the electrocatalyst particles (3) to one another or to the solid polymer electrolyte membrane (5). For realizing these states to form the above-mentioned optimum microstructure in the catalyst layer, the following various production processes are suitable.

All of the following various production processes are processes for producing an electrode by fixing a mixture of solutions or dispersions of proton-conductive polymers, respectively, electrocatalyst particles and a catalyst-supporting substance therefor, and are characterized mainly by a method for mixing the proton-conductive polymers.

One of the processes is a production process characterized by comprising a step of mixing a solution prepared by dissolving the proton-conductive polymer (1) to be allowed to assume the primary presence state, in water or a solvent, a dispersion prepared by dispersing the proton-conductive polymer (2) to be allowed to assume the secondary presence state, in the form of micelles in water or an aqueous solvent, and at least the electrocatalyst particles (3) and the supporting substance therefor (4).

Another process is a production process characterized by comprising a step of mixing a dispersion in which the proton-conductive polymer (1) to be allowed to assume the primary presence state is dispersed in water or a solvent in such a dispersed state that the size of dispersed particles is smaller than that of the proton-conductive polymer (2) to be allowed to assume the secondary presence state; a dispersion in which the proton-conductive polymer (2) to be allowed to assume the secondary presence state is dispersed in water or a solvent in such a dispersed state that the size of dispersed particles is larger than that of the proton-conductive polymer (1) to be allowed to assume the primary presence state; and at least the electrocatalyst particles (3) and the supporting substance therefor (4).

Further another process is a production process characterized by comprising a step of mixing a solution prepared by dissolving the proton-conductive polymer (1) to be allowed to assume the primary presence state, in water or a solvent, and at least the electrocatalyst particles (3) and the supporting substance therefor (4), and then mixing therewith a dispersion of the proton-conductive polymer (2) to be allowed to assume the secondary presence state.

Still another process is a production process characterized by comprising a step of mixing a dispersion in which the proton-conductive polymer (1) to be allowed to assume the primary presence state is dispersed in water or a solvent so as to have a size of dispersed particles which is smaller than that of the proton-conductive polymer (2) to be allowed to assume the secondary presence state; and at least the electrocatalyst particles (3) and the supporting substance therefor (4), and then mixing therewith a dispersion of the proton-conductive polymer (2) to be allowed to assume the secondary presence state.

As still another production process, it is also possible to precipitate the electrocatalyst particles (3) in a liquid containing the proton-conductive polymer (1) and the catalyst-supporting substance (4), and then mix a dispersion of the proton-conductive polymer (2) therewith. As still another production process, it is also possible to precipitate the electrocatalyst particles (3) in a liquid containing the proton-conductive polymer (1) and the catalyst-supporting substance (4), dry the liquid or make the proton-conductive polymer (1) insoluble or slightly soluble, and then mix a dispersion of the proton-conductive polymer (2) therewith.

In any of the processes, an ultrasonic homogenizer and a method using a commonly used rotary dispersing apparatus can be employed when the solution(s) or dispersion(s) of the proton-conductive polymer(s), the electrocatalyst particles and the supporting substance therefor are mixed.

In a preferable embodiment of the present invention, the proton-conductive polymer (1) in the primary presence state is insoluble or slightly soluble in water or methanol at the time of use in a fuel cell. Particularly when the proton-conductive polymer (1) to be allowed to assume the primary presence state is soluble in water or methanol, it is preferably insolubilized.

Therefore, the following is preferable: a solution prepared by dissolving the proton-conductive polymer (1) to be allowed to assume the primary presence state, in water or a solvent is mixed with at least the electrocatalyst particles (3) and the supporting substance therefor (4), and then the proton-conductive polymer (1) to be allowed to assume the primary presence state is made insoluble or difficultly soluble, after which a dispersion of the proton-conductive polymer (2) to be allowed to assume the secondary presence state is mixed therewith.

Also in the case of the dispersion in which the proton-conductive polymer (1) to be allowed to assume the primary presence state is dispersed in water or a solvent so as to have a size of dispersed particles which is smaller than that of the proton-conductive polymer (2) to be allowed to assume the secondary presence state. The following is preferable: this dispersion is mixed with at least the electrocatalyst particles (3) and the supporting substance therefor (4), and then the proton-conductive polymer (1) to be allowed to assume the primary presence state is made insoluble or slightly soluble, after which a dispersion of the proton-conductive polymer (2) to be allowed to assume the secondary presence state is mixed therewith.

As to a method for making the proton-conductive polymer (1) to be allowed to assume the primary presence state insoluble or slightly soluble, the proton-conductive polymer (1) to be allowed to assume the primary presence state is mixed with at least the electrocatalyst particles (3) and the supporting substance therefor (4), and then, if necessary, reacted with an insolubilizer with heating after or without removing the water or solvent by drying.

When the water or solvent is removed by drying, the proton-conductive polymer (1) can be made insoluble or slightly soluble by heat treatment at preferably 150° C. or higher.

Without removing the water or solvent by drying, the proton-conductive polymer (1) can be made insoluble or slightly soluble by adding a small amount of a polyvalent metal salt such as calcium chloride, magnesium chloride, aluminum chloride or the like as an insolubilizer, followed by mixing, reaction, filtration, purification and drying.

After or without removing the water or solvent by drying, the proton-conductive polymer (1) can be made insoluble or slightly soluble by adding as a crosslinking agent a small amount of a compound having two or more functional groups reactive with the alkali-reactive functional groups of the proton-conductive polymer (1), followed by mixing, reaction, filtration, purification and drying. Such a crosslinking agent includes ethylene glycol, glycerol, glycidol, ethylenediamine, hexamethylenediamine, hexamethylene diisocyanate, etc.

The proportion of the insolubilizer or crosslinking agent added in a small amount should correspond to not more than one-half, preferably not more than one-fourth, the equivalent weight for alkali-reactive functional group of the proton-conductive polymer (1). This is because the alkali-reactive functional groups of the proton-conductive polymer (1) should achieve proton conduction and adhesion to the electrocatalyst particles (3) or the supporting substance (4) and then should contribute to making the proton-conductive polymer (1) insoluble or slightly soluble.

After a small amount of the insolubilizer or crosslinking agent is added and mixing and reaction are carried out but not filtration, purification and drying, a dispersion of the proton-conductive polymer (2) to be allowed to assume the secondary presence state can be added, followed by mixing.

The proton-conductive polymer (1) to be allowed to assume the primary presence state is preferably used in a concentration at which neither the electrocatalyst particles (3) nor the supporting substance (4) are aggregated by the treatment for making the proton-conductive polymer (1) insoluble or slightly soluble. When the aggregation occurs, it is possible to grind the aggregates finely, add a dispersion of the proton-conductive polymer (2) to be allowed to assume the secondary presence state, and conduct mixing.

Various methods can be adopted for forming an electrode by fixing the particle dispersion obtained above which constitutes an electrocatalyst layer. The methods include, for example, a method in which said dispersion is applied on a polytetrafluoroethylene (PTFE) film, dried, shaped and then transferred to the surface of a solid polymer electrolyte membrane; a method in which said dispersion is applied on an electrode support treated so as to be impermeable to the dispersion, dried and then joined to or brought into contact with a solid polymer electrolyte membrane; and a method in which the ion-exchange groups of a solid polymer electrolyte membrane are converted to Na type groups, after which said dispersion is applied on the solid polymer electrolyte membrane and dried with heating, and then the ion-exchange groups are re-converted to H type groups. The proton-conductive polymers cannot have a sufficient conductivity unless they are finally of a proton type. In order to improve the heat resistance of a solid polymer electrolyte membrane and the proton-conductive polymers during joining, it is also possible to substitute each proton-conductive polymer with a monovalent metal ion (e.g. a sodium ion or a potassium ion) or a divalent or trivalent metal ion, heat-treat the substituted proton-conductive polymer, and then finally convert this proton-conductive polymer to a proton type polymer.

As to the amount of the proton-conductive polymers present in the electrocatalyst layer, the ratio of the total weight of the proton-conductive polymer (1) in the primary presence state and the proton-conductive polymer (2) in the secondary presence state to the weight of the supported catalyst ranges preferably from 0.1 to 10, more preferably 0.2 to 2. As to the amount of the proton-conductive polymer (1) in the primary presence state, the weight ratio of this polymer to the supported catalyst ranges preferably from 0.01 to 1, more preferably 0.01 to 0.5. As to the amount of the proton-conductive polymer (2) in the secondary presence state, the weight ratio of this polymer to the supported catalyst ranges preferably from 0.1 to 10, more preferably 0.2 to 2.0. When the amount of the proton-conductive polymer (1) in the primary presence state is too small, the utilization factor of the catalyst is undesirably low. When the amount of the proton-conductive polymer (2) in the secondary presence state is too small, binding of particles of the supporting substance to one another and to the solid polymer electrolyte membrane (5) and a gas-diffusion electrode layer is insufficient, so that the transfer and conduction of protons is undesirably insufficient. When the amount of the proton-conductive polymer (1) in the primary presence state is too large, the transfer and conduction of a gas and electrons are undesirably insufficient. When the amount of the proton-conductive polymer (2) in the secondary presence state is too large, the microstructure in the electrode layer is unsatisfactory, so that the conduction of a gas and electrons is undesirably insufficient. Therefore, good results can be generally obtained when the weight of the polymer in the primary presence state is lighter than that of the polymer in the secondary presence state.

In the solid polymer electrolyte membrane (5) used for constructing a fuel cell by the use of the electrode of the present invention, a material similar in kind to the proton-conductive polymers referred to herein can be used. That is, polymers composed of a fluorine-containing polymer as a skeleton and having groups of at least one kind selected from sulfonic acid group and carboxylic acid group are preferable as said material. Membranes of such polymers different in EW can be laminated, and membranes of such polymers can be reinforced with fibrils, woven fabric, nonwoven fabric, a microporous membrane or the like and can be reinforced by coating the membrane surface with an inorganic oxide or a metal.

The electrode support (6) used for constructing a fuel cell by the use of the electrode of the present invention functions as a gas-diffusion layer, a current collector or a support, and electroconductive porous woven fabric or nonwoven fabric such as carbon paper, carbon cloth or the like is used as the electrode support (6).

The electrode of the present invention can be incorporated with polytetrafluoroethylenes and other fluororesins, which are for enhancing water repellency and air permeability; carbon fiber and other electroconductive materials which are for enhancing the electroconductivity; and other materials, besides the above-mentioned electrocatalyst particles (3), supporting substance therefor (4) and proton-conductive polymers (1) and (2).

The present invention is illustrated below in further detail with reference to examples, which should not be construed as limiting the scope of the invention.

EXAMPLE 1

Platinum-catalyst-supporting carbon (content of supported platinum: 40 wt %) (mfd. by E-TEK Corp., USA) and a 0.5 wt % solution of a proton type perfluorocarbon sulfonic acid polymer resin (1) (mfd. by ASAHI Chemical Industry Co., Ltd.; EW=820, MI=210 (measuring temperature: 150° C.), composition of solvent: ethanol/water=50/50) were mixed and stirred so that the weight ratio of the platinum catalyst to the polymer was 10:4, to obtain a paste. The paste was heated at 160° C. for 30 minutes to prepare a polymer-coated platinum catalyst previously.

Then, the polymer-coated platinum catalyst and a 5 wt % solution of a proton type perfluorocarbon sulfonic acid polymer resin (2) having an EW value of 1030 and a MI value of 20 (measuring temperature: 270° C.) (mfd. by ASAHI Chemical Industry Co., Ltd.; composition of solvent: the same as above) were mixed so that the weight ratio of the platinum catalyst to this polymer was 10:4. The resulting mixture was subjected to uniform dispersion with an ultrasonic homogenizer to prepare a paste. This paste was applied on polytetrafluoroethylene sheets by the use of a 200-mesh screen, dried at 100° C. in the air to be fixed, whereby catalyst sheets supporting platinum thereon in an amount of 0.2 mg/cm$^2$ were obtained.

The two catalyst layer sheets thus obtained were placed facing each other. A perfluorocarbon sulfonic acid membrane having an EW value of 950 and a thickness of 100 μm (mfd. by ASAHI Chemical Industry Co., Ltd.) was held between the catalyst layer sheets, followed by hot pressing at 150° C. and a pressure of 50 kg/cm$^2$. Then, the polytetra-fluoroethylene sheets on both sides were peeled off to produce a membrane-electrodes assembly.

As electrode supports, carbon papers of about 200 μm in thickness (mfd. by TORAY Industries Inc.) were previously immersed in a tetrafluoroethylene dispersion (60 wt %) and then sintered at 340° C. to be impregnated with the dispersion in an amount of 20 wt % based on the weight of the carbon paper. The void content of the impregnated carbon papers was 70%.

The membrane-electrodes assembly and the electrode supports (6) thus obtained were set in an apparatus for evaluating a single cell for fuel cell, and a single cell characteristics test was carried out at atmospheric pressure and a cell temperature of 70° C. by using hydrogen gas as a fuel and air as an oxidizing agent. The hydrogen gas was moistened at 80° C. and the air was supplied to the cell as it was without moistening. Output voltages of 0.732 V and 0.630 V were obtained at current densities of 0.5 A/cm$^2$ and 1.0 A/cm$^2$, respectively.

Also in the following examples and comparative examples, the tests were carried out by employing the same membrane-electrodes joining method, diffusion layers, and single cell operating conditions as described above.

EXAMPLE 2

The same 0.5 wt % proton type perfluorocarbon sulfonic acid polymer resin (1) solution as above and the same 5 wt % proton type perfluorocarbon sulfonic acid polymer resin (2) solution as above were mixed at the same time with platinum-catalyst-supporting carbon (content of supported platinum: 40 wt %) (mfd. by E-TEK Corp., USA) so that the weight ratio of the platinum catalyst to the former polymer and the weight ratio of the platinum catalyst to the latter polymer was 10:1 and 10:4, respectively. The resulting mixture was subjected to uniform dispersion with an ultrasonic homogenizer to prepare a paste. This paste was applied on polytetrafluoroethylene sheets by the use of a 200-mesh screen, dried at 120° C. in the air to be fixed, whereby catalyst sheets supporting platinum thereon in an amount of 0.21 mg/cm$^2$ were obtained. The two catalyst layer sheets thus obtained were placed facing each other. Thereafter, a membrane-electrodes assembly was produced by the same method as in Example 1. Output voltages of 0.718 V and 0.611 V were obtained at current densities of 0.5 A/cm$^2$ and 1.0 A/cm$^2$, respectively.

EXAMPLE 3

A 5 wt % solution of a proton type perfluorocarbon sulfonic acid polymer resin (3) (mfd. by ASAHI Chemical Industry Co., Ltd.; EW=680, MI=2060 (measuring temperature: 270° C.), composition of solvent: ethanol/water=50/50) was mixed with platinum-catalyst-supporting carbon (content of supported platinum: 40 wt %) (mfd. by E-TEK Corp., USA) so that the weight ratio of the platinum catalyst to the polymer was 10:5. The resulting mixture was subjected to uniform dispersion to obtain a paste. A 5 wt % solution of a proton type perfluorocarbon sulfonic acid polymer resin (4) having an EW value of 910 and a MI value of 20 (mfd. by the same company as above; composition of solvent: the same as above) was mixed with the paste so that the weight ratio of the platinum catalyst to this polymer was 10:4. The resulting mixture was subjected to uniform dispersion with an ultrasonic homogenizer to prepare a paste. Using this paste, catalyst sheets supporting platinum thereon in an amount of 0.2 mg/cm$^2$ were obtained by the use of a 200-mesh screen in the same manner as in Example 1.

The two catalyst layer sheets thus obtained were placed facing each other, and a fuel cell was produced in the same manner as in Example 1 and evaluated in the same manner as in Example 1.

Output voltages of 0.700 V and 0.60 V were obtained at current densities of 0.5 A/cm$^2$ and 1.0 A/cm$^2$, respectively.

COMPARATIVE EXAMPLE 1

A 5 wt % solution of the proton type perfluorocarbon sulfonic acid polymer resin (4) was added to platinum-catalyst-supporting carbon (content of supported platinum: 40 wt %) (mfd. by E-TEK Corp., USA) so that the weight ratio of the platinum catalyst to the polymer was 2:1. The resulting mixture was subjected to uniform dispersion with an ultrasonic homogenizer to prepare a paste. In the same manner as in Example 1, the paste was applied on polytetra-fluoroethylene sheets by the use of a 200-mesh screen, dried at 100° C. in the air to be fixed, whereby catalyst sheets supporting platinum thereon in an amount of 0.22 mg/cm$^2$ were obtained. A fuel cell was produced in the same manner as in Example 1 except for using these catalyst sheets, and was evaluated.

Output voltages of 0.53 V and 0.25 V were obtained at current densities of 0.5 A/cm$^2$ and 1.0 A/cm$^2$, respectively.

The roughness factor (catalyst utilization factor) values of the platinum catalysts used in the cathode in Examples 1, 2 and 3 and Comparative Example 1 were determined from the area of a hydrogen desorption peak in a cyclic voltanogram and found to be 195, 155, 160 and 54, respectively.

INDUSTRIAL APPLICABILITY

The electrode of the present invention can be utilized as an electrode for solid polymer electrolyte fuel cells as a substitute power source for automobiles, a co-generation system for domestic use, and portable electric generators.

The invention claimed is:

1. A process for producing an electrode for a solid polymer electrolyte fuel cell comprising forming the electrode by fixing a mixture of solutions or dispersions of proton-conductive polymers, electrocatalyst particles and a catalyst-supporting substance therefor, which comprises (a) a step of mixing a solution or dispersion in water or a solvent of a first proton-conductive polymer which has an MI value higher than that of a second proton-conductive polymer and a precursor of which has an MI (melt index measured at 270° C., according to ASTM standard D1238) value of 210 or more, the electrocatalyst particles and the catalyst-supporting substance therefor, to produce a catalyst at least partly covered with the first proton-conductive polymer, and (b) a step of mixing the catalyst obtained in the step (a) with a dispersion in water or a solvent of the second proton-conductive polymer a precursor of which has an MI (melt index measured at 270° C., according to ASTM standard D1238) value in a range of 0.1 to 20.

2. A process for producing an electrode for a solid polymer electrolyte fuel cell according to claim 1, characterized in that the first and the second proton-conductive polymers are perfluorocarbon copolymers having sulfonic acid groups.

3. A process for producing an electrode for a solid polymer electrolyte fuel cell comprising forming the electrode by fixing a mixture of solutions or dispersions of proton-conductive polymers, electrocatalyst particles and a catalyst-supporting substance therefor, which comprises (a) a step of mixing a solution or dispersion of a first proton-conductive polymer a precursor of which has an MI (melt index measured at 270° C., according to ASTM standard D1238) value of 210 or more in water or a solvent, the electrocatalyst particles and the catalyst-supporting substance therefor, (b) a step of making the first proton-conductive polymer on the catalyst obtained in the step (a) insoluble or slightly soluble, and (c) a step of mixing a dispersion of a second proton-conductive polymer a precursor of which has an MI (melt index measured at 270° C., according to ASTM standard D1238) value in a range of 0.1 to 20 with the catalyst obtained in the step (b).

* * * * *